(12) United States Patent
Fay, II et al.

(10) Patent No.: US 11,343,953 B2
(45) Date of Patent: May 31, 2022

(54) COUNTER SPRING LATCH MECHANISM AND AGRICULTURAL MACHINE

(71) Applicant: CNH Industrial America LLC, New Holland, PA (US)

(72) Inventors: Jeffrey Brown Fay, II, Oxford, PA (US); Melanie W. Harkcom, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 291 days.

(21) Appl. No.: 16/449,520

(22) Filed: Jun. 24, 2019

(65) Prior Publication Data

US 2020/0396890 A1    Dec. 24, 2020

(51) Int. Cl.
*A01D 67/00*     (2006.01)
*A01D 75/00*     (2006.01)
(Continued)

(52) U.S. Cl.
CPC .......... *A01B 59/006* (2013.01); *A01B 73/005* (2013.01); *A01B 73/06* (2013.01); *A01D 67/005* (2013.01); *A01D 75/004* (2013.01); *E05B 57/00* (2013.01); *E05B 81/10* (2013.01); *E05Y 2900/518* (2013.01)

(58) Field of Classification Search
CPC ................ A01D 67/005; A01D 75/004; A01D 78/1014; A01D 41/144; A01D 75/002; A01D 78/1007; A01D 41/148; A01D 78/1021; A01D 34/065; A01D 34/43; A01D 75/24; A01D 34/64; A01D 34/032; A01D 34/046; A01B 59/006; A01B 73/005;
(Continued)

(56) References Cited

U.S. PATENT DOCUMENTS 181,443 A * 8/1876 Hunt et al. ........... A01D 41/148
56/90
3,162,459 A * 12/1964 Lawson ............... A01B 73/067
280/656
(Continued)

FOREIGN PATENT DOCUMENTS

CA    2810124 A1 *  9/2014 ............ A01B 29/06
EP    0426588 A1 *  5/1991 ........... A01D 67/005
GB    2330060 A  *  4/1999 ........... A01B 59/006

*Primary Examiner* — Thomas B Will
*Assistant Examiner* — Madeline I Runco
(74) *Attorney, Agent, or Firm* — Peter K. Zacharias; Patrick M. Sheldrake

(57) ABSTRACT

A latch mechanism is used with agricultural equipment, such as a mower, for securing the header of the mower to the tongue during transport. A pivoting catch is mounted on the trail frame on which the header is mounted. A receiver for the catch is mounted on the tongue. During mower transport the catch is biased into engagement with the receiver by a first spring and secures the header to the tongue in a parallel orientation. When the mower configuration is changed to operational mode the catch is disengaged from the receiver using a second spring attached to the catch. A cable attaches the second spring to a wheel arm of a field wheel. Deployment of the field wheel into the operation mode draws the cable and second spring into tension, overcoming the biasing force of the first spring and pivoting the catch out of engagement with the receiver.

20 Claims, 6 Drawing Sheets

(51) Int. Cl.
  *A01B 59/00* (2006.01)
  *A01B 73/00* (2006.01)
  *A01B 73/06* (2006.01)
  *E05B 81/10* (2014.01)
  *E05B 57/00* (2006.01)

(58) Field of Classification Search
  CPC ..... A01B 73/06; A01B 63/102; A01B 63/045; E05C 3/045; E05C 3/30
  See application file for complete search history.

(56) References Cited

U.S. PATENT DOCUMENTS

| | | | | |
|---|---|---|---|---|
| 3,874,459 A * | 4/1975 | Herberholz | .......... | A01B 73/067 172/311 |
| 4,042,045 A | 8/1977 | Kent | | |
| 4,306,432 A * | 12/1981 | Ravid | .......... | E05C 9/06 292/34 |
| 4,361,341 A * | 11/1982 | Gustafson | .......... | B60D 1/00 172/248 |
| 4,364,581 A | 12/1982 | Shoup | | |
| 4,381,118 A * | 4/1983 | Weeks | .......... | A01B 73/00 172/311 |
| 4,425,971 A | 1/1984 | Hoorwood | | |
| 5,113,956 A | 5/1992 | Friesen et al. | | |
| 5,724,798 A * | 3/1998 | Stefl | .......... | A01D 41/144 172/311 |
| 6,076,613 A * | 6/2000 | Frasier | .......... | A01B 73/065 111/57 |
| 6,206,105 B1 * | 3/2001 | Friesen | .......... | A01B 73/065 111/54 |
| 6,273,449 B1 * | 8/2001 | Harkcom | .......... | A01B 73/005 280/463 |
| 6,511,279 B1 * | 1/2003 | Harkcom | .......... | A01D 75/004 280/475 |
| 6,595,299 B2 * | 7/2003 | Heller | .......... | A01B 59/043 172/272 |
| 7,334,624 B2 * | 2/2008 | Waldman | .......... | E05B 17/2053 160/144 |
| 7,431,221 B2 * | 10/2008 | Thompson | .......... | A01B 73/065 239/166 |
| 7,924,576 B2 * | 4/2011 | Tang | .......... | G06F 1/181 361/807 |
| 8,141,653 B2 | 3/2012 | Ryder et al. | | |
| 9,220,188 B2 * | 12/2015 | Graham | .......... | A01D 78/146 |
| 9,883,623 B2 * | 2/2018 | Koch | .......... | A01B 63/1145 |
| 10,051,775 B2 * | 8/2018 | Sudbrink | .......... | A01B 73/06 |
| 2010/0307780 A1 * | 12/2010 | Hulicsko | .......... | A01B 73/067 172/311 |
| 2016/0007534 A1 | 1/2016 | Fay, II | | |
| 2017/0000008 A1 * | 1/2017 | Anderson | .......... | A01C 7/208 |
| 2017/0071123 A1 * | 3/2017 | Sivinski | .......... | A01B 73/065 |

\* cited by examiner

COUNTER SPRING LATCH MECHANISM AND AGRICULTURAL MACHINE

FIELD OF THE INVENTION

This invention relates to latch mechanisms for releaseably securing elements to one another.

BACKGROUND

Agricultural machines, such as towed mowers, are designed to be configured for towing at relatively high speeds over roads to transport the mower between fields. Such machines are also designed to be configured for operation, towed at lower speeds to mow crops in the field. It is convenient to pivot the mower's header (which houses the crop cutting blades) into a substantially parallel orientation with respect to the tongue (which attaches the mower to the tractor) during transport. It is important to reliably secure the header to the tongue during transport so that it does not pivot into an orientation transverse to the tongue and thereby place stress on the mower structure for which it was not designed. This orientation may also cause the tractor or other towing vehicle to become unstable. It is further desirable to be able to release the header from the tongue so that the mower can be readily converted to its operational configuration. There is an opportunity to simplify the latching and unlatching of headers using simple mechanical means to improve reliability and robustness of agricultural equipment.

SUMMARY

The invention concerns a latch mechanism for releasably securing a first item to a second item. In an example embodiment the latch mechanism comprises a catch mountable on the first item for pivoting motion about a fulcrum. A receiver is mountable on the second item. The catch is engageable with the receiver. A first spring acts between the catch and the first item on a first side of the fulcrum for biasing the catch into engagement with the receiver. The first spring has a first spring constant. A swing arm is mountable on the first item for pivoting motion relatively thereto. A second spring acts between the swing arm and the catch on a second side of the fulcrum opposite to the first side. The second spring has a second spring constant. Pivoting motion of the swing arm applies tension to the second spring, thereby pivoting the catch about the fulcrum and disengaging it from the receiver.

In an example embodiment the second spring constant is greater than the first spring constant. An example latch mechanism may further comprise a cable extending between the second spring and the swing arm. Additionally, an actuator may act between the first item and the swing arm for effecting pivoting motion of the swing arm relatively to the first item.

The invention also encompasses a latch mechanism for releasably securing a trail frame to a tongue of an agricultural machine having a field wheel mounted on a wheel arm pivotably attached to the trail frame. In an example embodiment the latch mechanism comprises a catch mountable on the trail frame for pivoting motion about a fulcrum. A receiver is mountable on the tongue. The catch is engageable with the receiver. A first spring acts between the catch and the trail frame on a first side of the fulcrum for biasing the catch into engagement with the receiver. The first spring has a first spring constant. A second spring acts between the wheel arm and the catch on a second side of the fulcrum opposite to the first side. The second spring has a second spring constant. Pivoting motion of the wheel arm moves the field wheel away from the trail frame applies tension to the second spring, thereby pivoting the catch about the fulcrum and disengaging it from the receiver.

In an example embodiment the second spring constant is greater than the first spring constant. An example latch mechanism may further comprise a cable extending between the second spring and the wheel arm. Additionally, an example latch mechanism may comprise an actuator acting between the trail frame and the wheel arm for effecting pivoting motion of the wheel arm relatively to the trail frame. In an example embodiment the cable has a length such that the cable is slack for a portion of motion of the actuator moving the wheel arm away from the trail frame. In a specific example, the portion of the motion of the actuator comprises at least 50% of a full range of motion of the actuator. An example embodiment may further comprise a third spring acting between the cable and the trail frame.

The invention further encompasses an agricultural machine. An example embodiment comprises a trail frame. A wheel arm is pivotably attached to the trail frame. A field wheel is mounted on the wheel arm. A tongue is pivotably mounted on the trail frame. A latch mechanism releasably secures the trail frame to the tongue. By way of example the latch mechanism comprises a catch mounted on the trail frame for pivoting motion about a fulcrum. A receiver is mounted on the tongue. The catch is engageable with the receiver. A first spring acts between the catch and the trail frame on a first side of the fulcrum for biasing the catch into engagement with the receiver. The first spring has a first spring constant. A second spring acts between the wheel arm and the catch on a second side of the fulcrum opposite to the first side. The second spring has a second spring constant. Pivoting motion of the wheel arm moves the field wheel away from the trail frame and applies tension to the second spring, thereby pivoting the catch about the fulcrum and disengaging it from the receiver.

In an example embodiment the second spring constant is greater than the first spring constant. By way of further example, a cable extends between the second spring and the wheel arm. In an example embodiment an actuator acts between the trail frame and the wheel arm for effecting pivoting motion of the wheel arm relatively to the trail frame. By way of example the cable has a length such that the cable is slack for a portion of motion of the actuator moving the wheel arm away from the trail frame. In a specific example the portion of the motion of the actuator comprises at least 50% of a full range of motion of the actuator. Further by way of example, a third spring may act between the cable and the trail frame. In an example embodiment the actuator comprises a hydraulic actuator. The agricultural machine may further comprise a header mounted on the trail frame. The header comprises a plurality of crop cutting blades.

DETAILED DESCRIPTION

Figure 1:
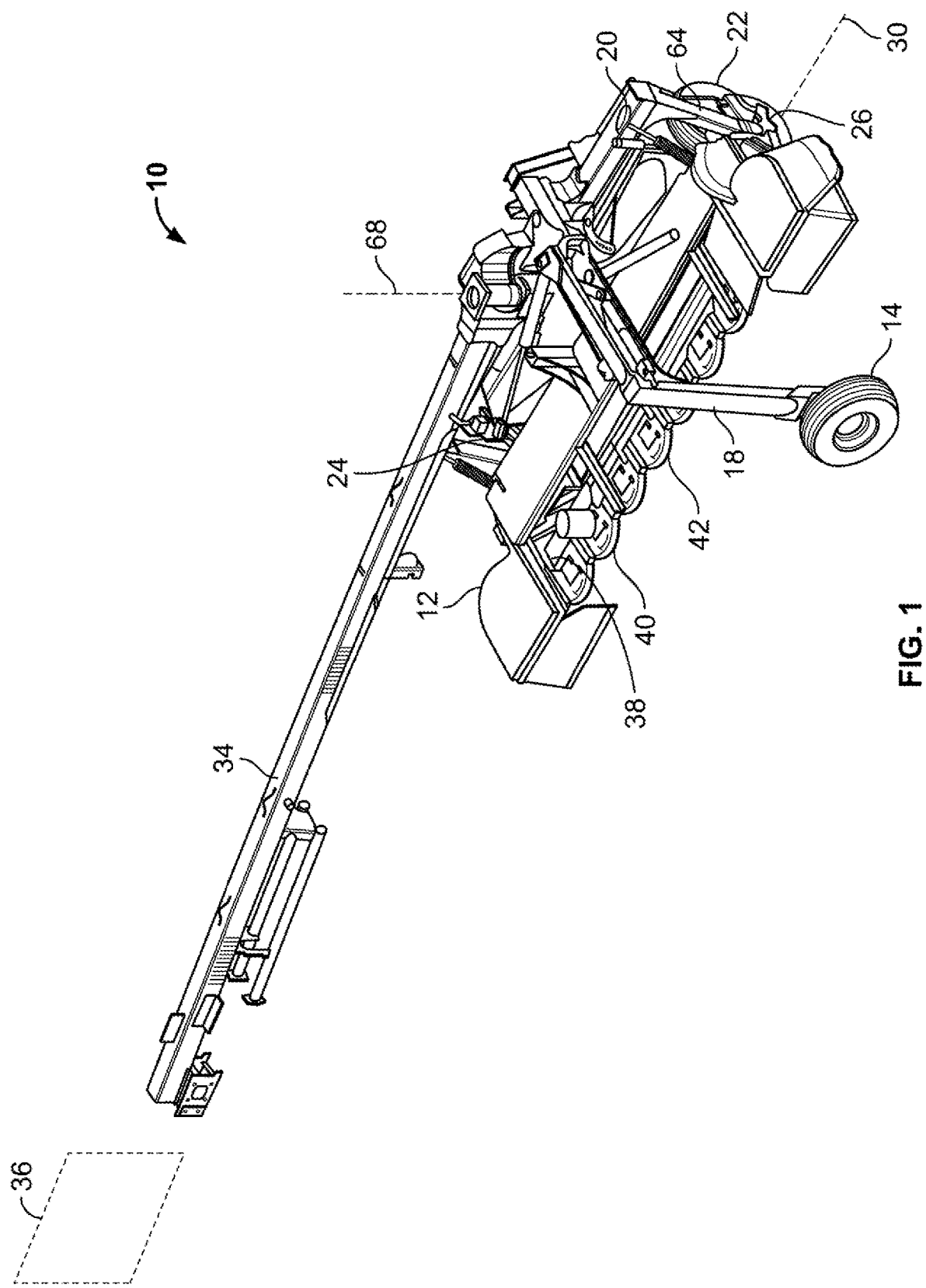
FIG. 1 is an isometric view of an agricultural machine, in this example a towed mower, shown configured for transport.
Figure 2:
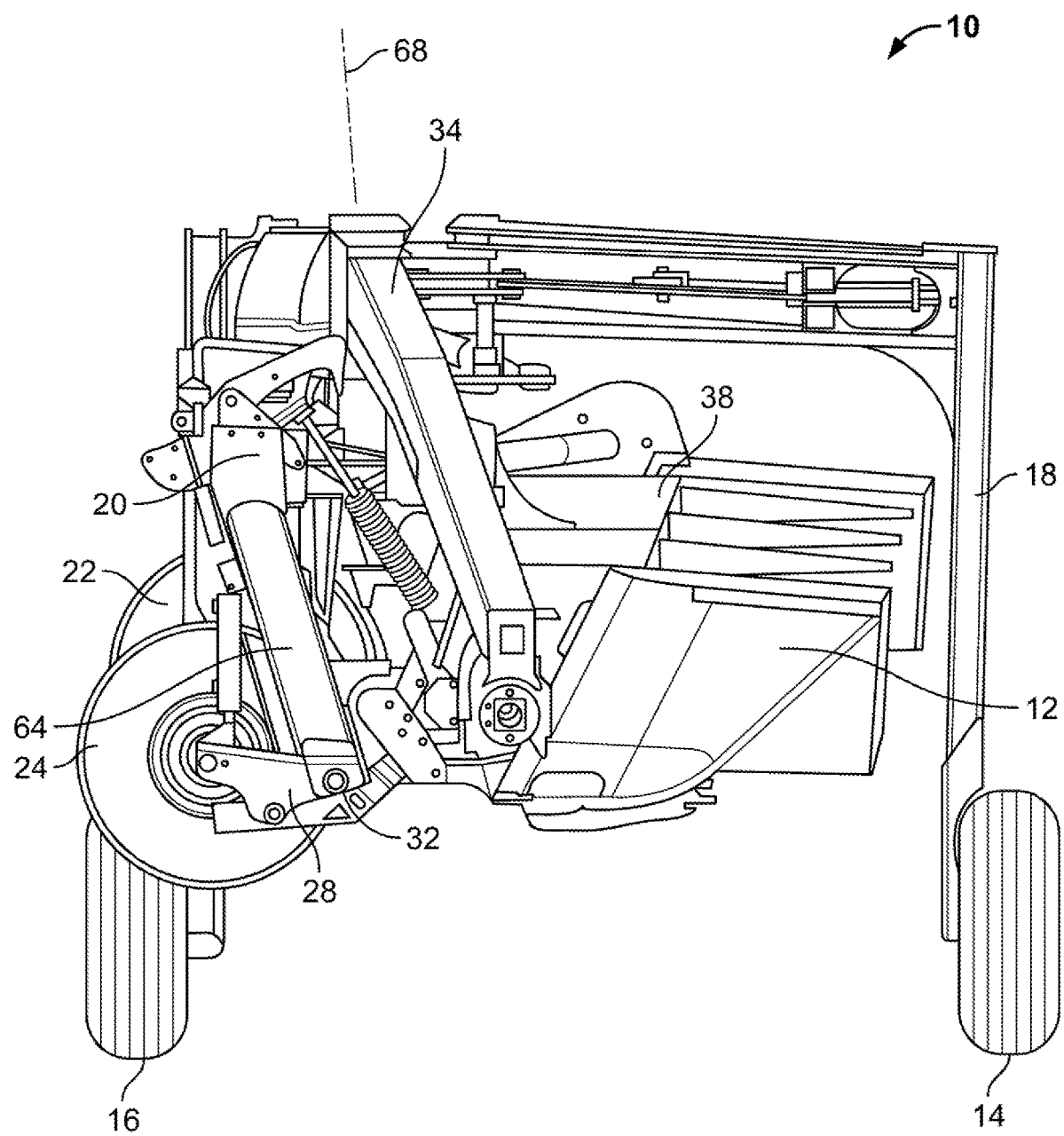
FIG. 2 is a front view of the mower shown in FIG. 1.
Figure 3:
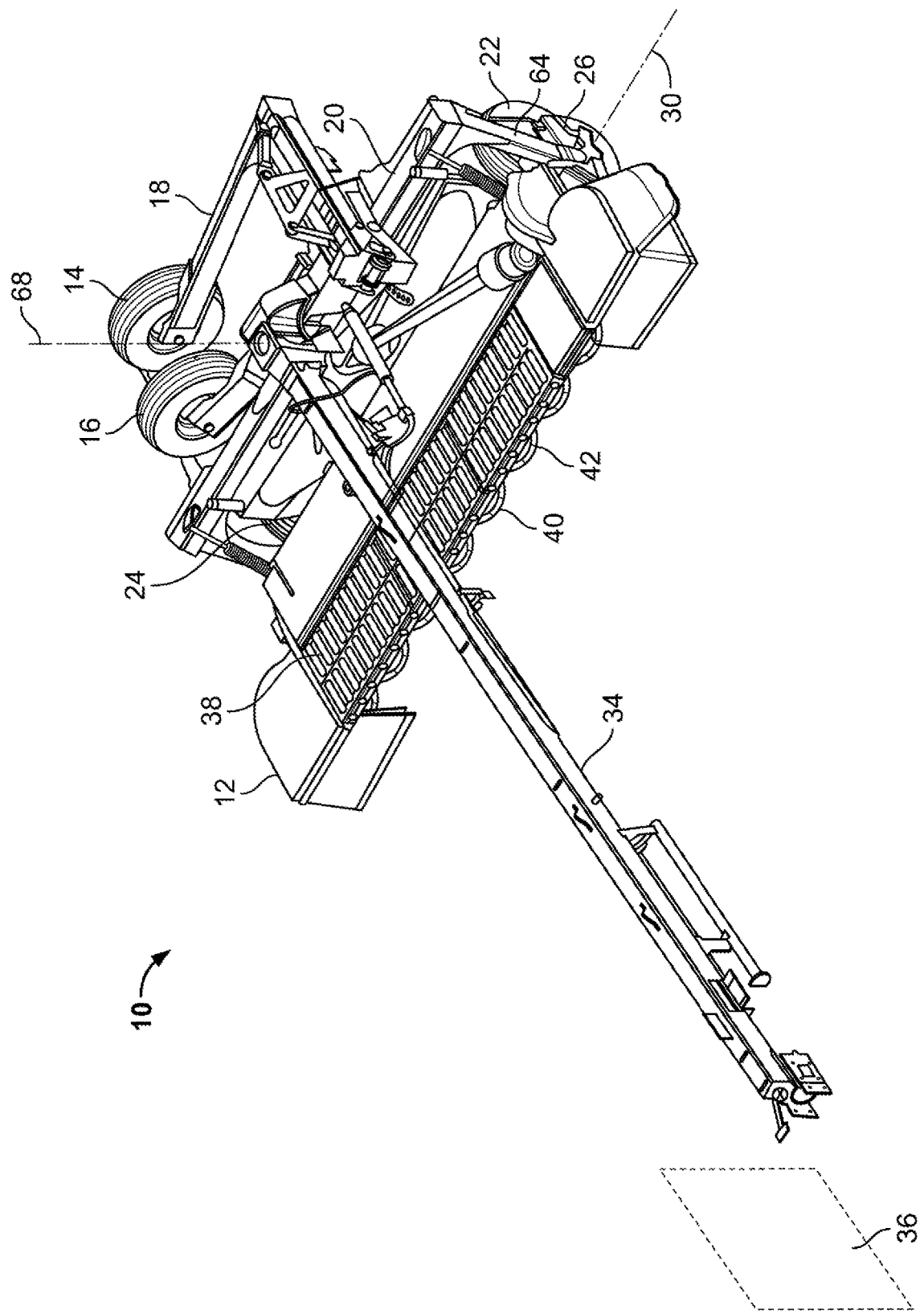
FIG. 3 is an isometric view of the mower of FIG. 1 shown configured for mowing.

FIGS. 1-3 show an agricultural machine 10, in this example a mower 12. A detailed description of an example mower is found in U.S. Pat. No. 10,143,138, hereby incorporated by reference herein. FIGS. 1 and 2 show the mower 12 in its transport configuration, supported on road wheels 14 and 16 as it would appear when towed over roadways between fields. Road wheels 14 and 16 are mounted on a road frame 18 which is attached to a trail frame 20. FIG. 3 shows the mower 12 in its field configuration, supported on field wheels 22 and 24, as it would appear when towed behind a tractor during mowing.

As shown in FIGS. 2 and 3, field wheels 22 and 24 are rotatably mounted on the trail frame 20 via respective wheel arms 26 and 28. Wheel arms 26 and 28 pivot about respective axes 30 and 32 and are movable between a deployed configuration for mowing, shown in FIG. 3, and a stowed configuration for transport, shown in FIGS. 1 and 2. A tongue 34 is pivotably attached to the trail frame 20, the tongue being attachable to a tractor 36 (shown schematically in FIGS. 1 and 3) for towing. In this example mower 12 a header 38 is mounted on a trail frame 20, the header having a plurality of rotating discs 40 comprising crop cutting blades 42.

Figure 4:
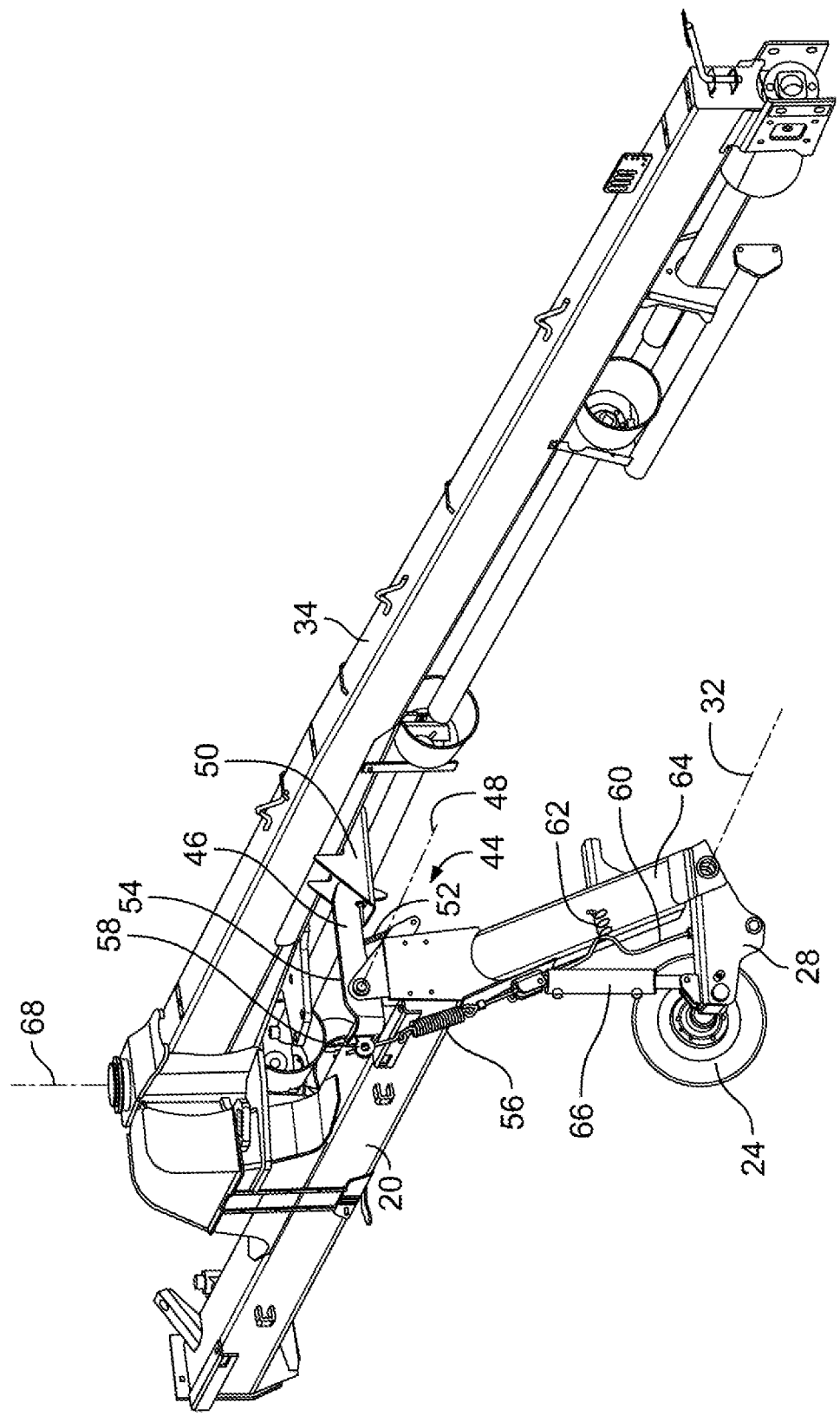
FIGS. 4, 5 and 6 are isometric views of a portion of the mower showing an example latching mechanism according to the invention in operation.

As shown in FIG. 4, a latch mechanism 44 is mounted on the trail frame 20 and the tongue 34. Latch mechanism releaseably secures the trail frame 20 to the tongue 34 during transport (FIG. 1), and releases the trail frame from the tongue so that the mower 12 may be configured in its field configuration (FIG. 3) for mowing. Latch mechanism 44 comprises a catch 46 mounted on the trail frame 20. Catch 46 is pivotable about a fulcrum axis 48 so that it may engage and disengage with a receiver 50 mounted on the tongue 34. A first spring 52 acts between the catch 46 and the trail frame 20. First spring 52 is attached to catch 46 on a first side 54 of the fulcrum axis 48 so as to bias the catch 46 into engagement with the receiver 50 and maintain the trail frame 20 secured to the tongue 34. A second spring 56 is attached to the catch 46 on a second side 58 of the fulcrum axis 48. The second spring 56 acts between the catch 46 and the wheel arm 28. In this example the connection between the spring 56 and the wheel arm 28 is effected via a cable 60 extending between the wheel arm 28 and the free end of the second spring 56. Any slack in cable 60 is conveniently taken up by a third spring 62, which acts between the cable 60 and a leg 64 of the trail frame 20 on which the wheel arm 28 is mounted.

Pivoting motion of the wheel arm 28 which moves the field wheel 24 between its stowed configuration for transport (FIG. 4) and its deployed configuration for mowing (FIG. 6) is effected in this example by an actuator 66. Actuator 66 acts between the trail frame 20 and the wheel arm 28. A similar actuator is also used to deploy and stow field wheel 22 (not shown). Actuator 66 in this example is a hydraulic actuator but may alternately comprise one of any number of different types of actuators including pneumatic actuators, mechanical actuators and electro-mechanical actuators to cite some examples.

Figure 5:
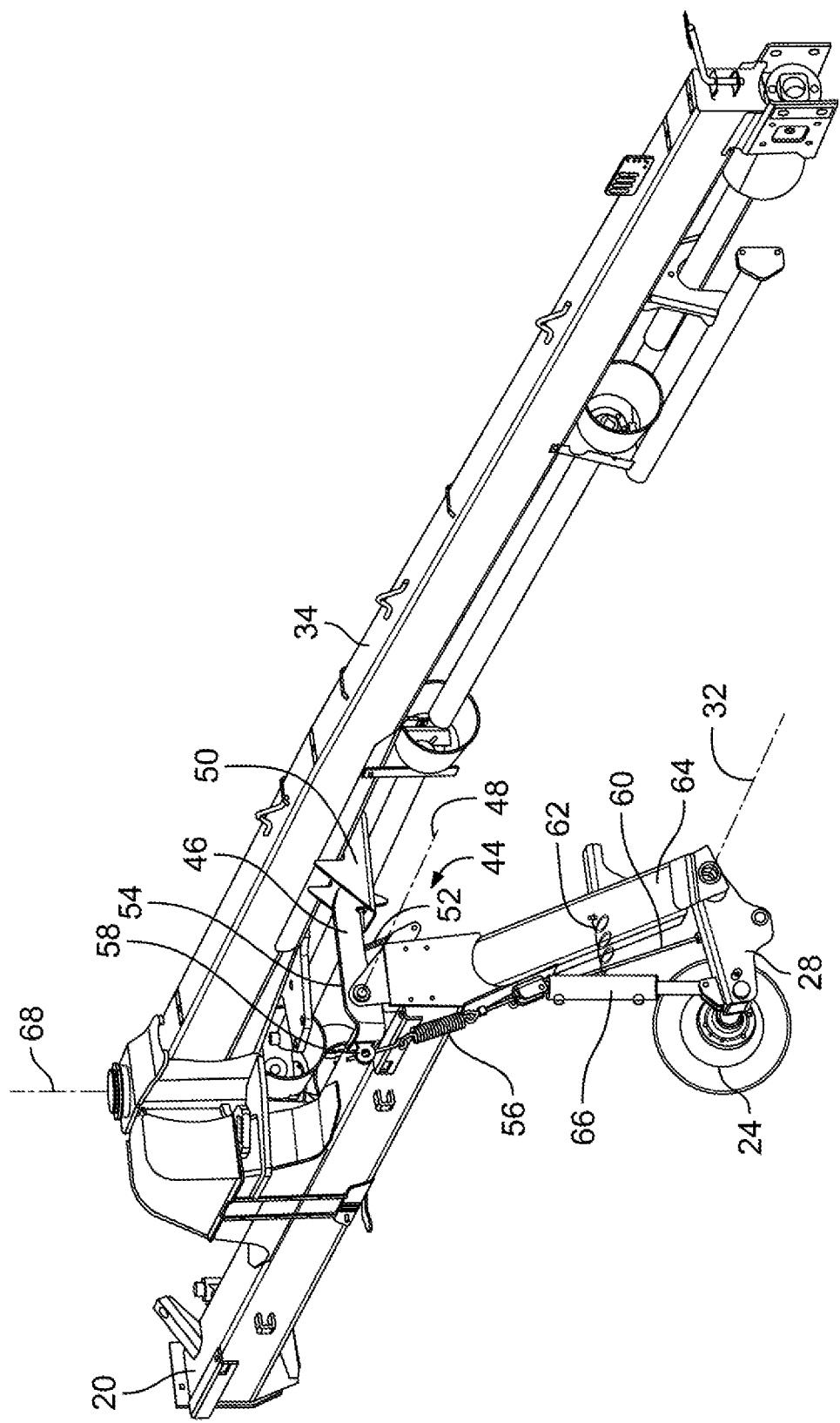
Figure 6:
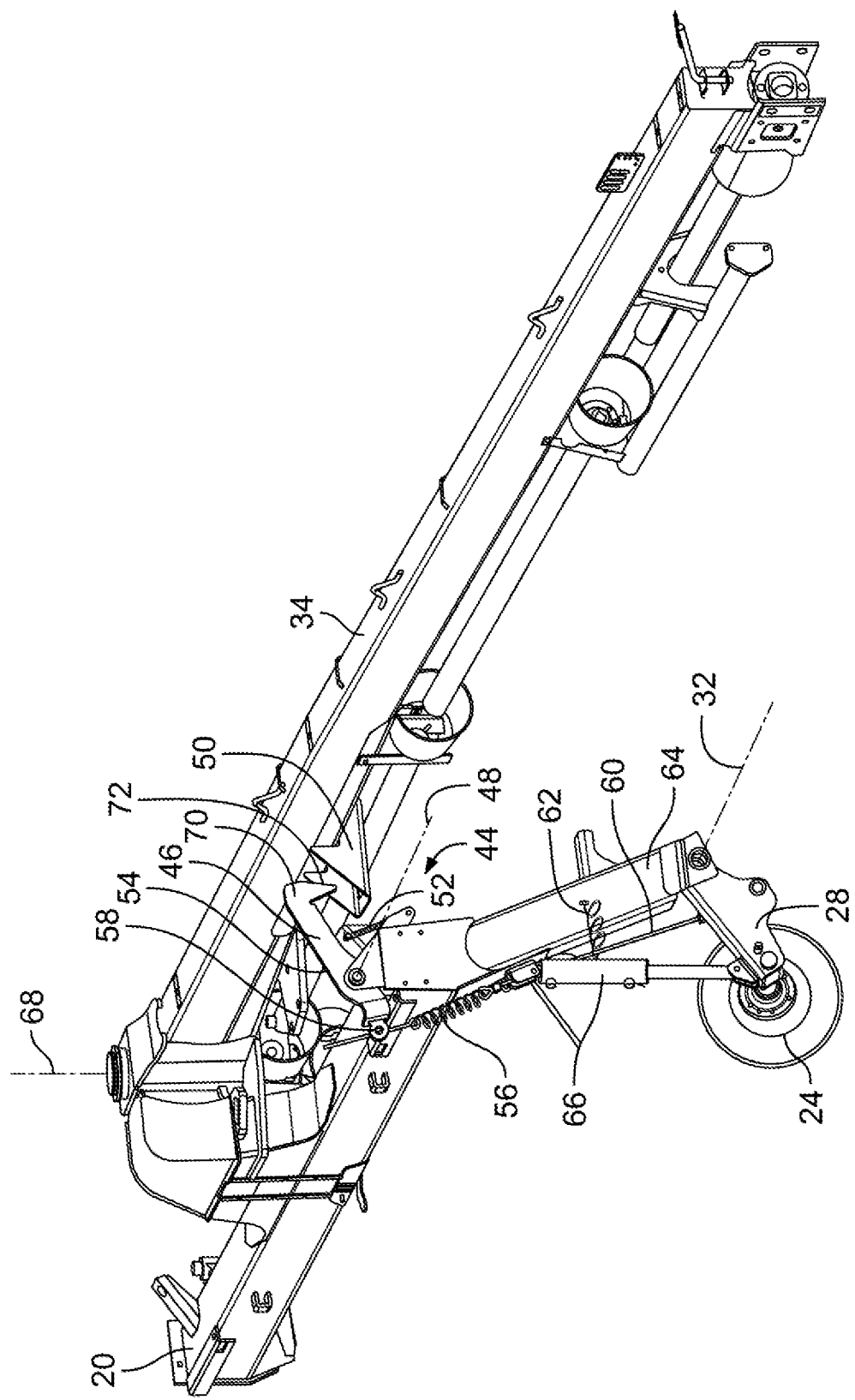

Operation of the latch mechanism 44 releasing the trail frame 20 from the tongue 34 when switching the mower 12 from transport to field configuration is illustrated in FIGS. 4-6. As shown in FIG. 4, the mower 12 is in its transport configuration with the field wheel 24 drawn upwardly toward the trail frame 20 by the pivoting action of wheel arm 28 effected by the actuator 66. The second spring 56 is not in tension, there being slack in cable 60, the slack cable being secured to the leg 64 by the third spring 62. First spring 52 is in tension and thereby holds the catch 46 in engagement with the receiver 50 to secure the trail frame 20 to tongue 34.

As shown in FIG. 5, to deploy the field wheel 24 the actuator 66 pivots the wheel arm 28 about its pivot axis 32, initially taking the slack out of cable 60. FIG. 5 shows the actuator 66 at 50% of its full range of motion, and it is considered advantageous that all of the slack be out of cable 60 at this point in the actuator's motion. Further motion of the actuator 66 pivots wheel arm 28 which, acting through cable 60, puts the second spring 56 in tension. FIG. 6 shows the actuator at full stroke to deploy the field wheel 24. The second spring 56 acts on the second side 58 of the fulcrum axis 48 of the catch 46. Because the second spring 56 is stiffer than the first spring 52 (i.e., the spring constant of the second spring 56 is greater than the spring constant of the first spring 52) acting on the first side 54 of the fulcrum axis 48, the force applied to the catch 46 by the second spring 56 overcomes the force applied to the catch by the first spring 52 and the catch 46 pivots about the fulcrum axis 48 and disengages from the receiver 50, thereby releasing the trail frame 20 from the tongue 34. At this point the road wheel 14 and 16 may be moved from their transport configuration (see FIGS. 1 and 2) and the tongue 34 may be pivoted relatively to the trail frame 20 about pivot axis 68 to place the mower 12 in its field configuration (FIG. 3) ready for mowing.

To reconfigure mower 12 for transport the tongue 34 is pivoted toward the trail frame 20 about its pivot axis 68 and the road wheels 14 and 16 are deployed so that they support the mower 12. Actuators 66 raise the field wheels 22 and 24. Slack is placed in cable 60 as the wheel arm 28 pivots about its pivot axis 32, thereby relieving tension on the second spring 56 and allowing the catch 46 to pivot about its fulcrum axis 48 under the tension of the first spring 52. Once the actuator 66 is fully retracted the catch 46 is in position to again engage the receiver 50 and secure the trail frame 20 to the tongue 34 for transport. Engagement between the catch 46 and receiver 50 may be effected by positioning the receiver beneath the catch as the catch pivots, or by forcing the receiver against the catch and allowing it to rise and snap into engagement. As shown in FIG. 6 the catch 46 comprises a hook 70 with an outwardly facing ramp surface 72 which allows the catch to pivot when the receiver 50 is pressed against it. Being spring biased, the catch 46 pivots as necessary but engages securely with the receiver 50 once the hook 70 is captured.

Agricultural machinery such as the mower 12 are expected to realize advantages when using the latch mechanism 44 according to the invention. The mechanism is simple and robust and ensures that the latch will remain securely engaged should the cable break or should the trail frame rotate to the transport configuration before the field wheels have been deployed.

What is claimed is:

1. A latch mechanism for releasably securing a first item pivotally connected to a second item, said latch mechanism comprising:
    a catch mountable on said first item for pivoting motion about a fulcrum;
    a receiver mountable on said second item, said catch being engageable with said receiver;

a first spring acting between said catch and said first item on a first side of said fulcrum for biasing said catch into engagement with said receiver, said first spring having a first spring constant;

a swing arm mountable on said first item for pivoting motion relatively thereto; and a second spring acting between said swing arm and said catch on a second side of said fulcrum opposite to said first side, said second spring having a second spring constant; wherein:

pivoting motion of said swing arm applies tension to said second spring, thereby pivoting said catch about said fulcrum and disengaging it from said receiver.

2. The latch mechanism according to claim 1, wherein said second spring constant is greater than said first spring constant.

3. The latch mechanism according to claim 1, further comprising a cable extending between said second spring and said swing arm.

4. The latch mechanism according to claim 1, further comprising an actuator acting between said first item and said swing arm for effecting pivoting motion of said swing arm relatively to said first item.

5. A latch mechanism for releasably securing a pivoting trail frame to a tongue of an agricultural machine having a field wheel mounted on a wheel arm pivotably attached to said trail frame, said latch mechanism comprising:

a catch mountable on said trail frame for pivoting motion about a fulcrum;

a receiver mountable on said tongue, said catch being engageable with said receiver;

a first spring acting between said catch and said trail frame on a first side of said fulcrum for biasing said catch into engagement with said receiver, said first spring having a first spring constant; and a second spring acting between said wheel arm and said catch on a second side of said fulcrum opposite to said first side, said second spring having a second spring constant; wherein:

pivoting motion of said wheel arm moving said field wheel away from said trail frame applies tension to said second spring, thereby pivoting said catch about said fulcrum and disengaging it from said receiver.

6. The latch mechanism according to claim 5, wherein said second spring constant is greater than said first spring constant.

7. The latch mechanism according to claim 5, further comprising a cable extending between said second spring and said wheel arm.

8. The latch mechanism according to claim 7, further comprising an actuator acting between said trail frame and said wheel arm for effecting pivoting motion of said wheel arm relatively to said trail frame.

9. The latch mechanism according to claim 8, wherein said cable has a length such that said cable is slack for a portion of motion of said actuator moving said wheel arm away from said trail frame.

10. The latch mechanism according to claim 9, wherein said portion of said motion of said actuator comprises at least 50% of a full range of motion of said actuator.

11. The latch mechanism according to claim 7, further comprising a third spring acting between said cable and said trail frame.

12. An agricultural machine, comprising:

a trail frame;

a wheel arm pivotably attached to said trail frame;

a field wheel mounted on said wheel arm;

a tongue pivotably mounted on said trail frame, said trail frame being pivotal relative to said tongue between a field position and a transport position; and a latch mechanism for releasably securing said trail frame to said tongue, said latch mechanism comprising:

a catch mounted on said trail frame for pivoting motion about a fulcrum;

a receiver mounted on said tongue, said catch being engageable with said receiver;

a first spring acting between said catch and said trail frame on a first side of said fulcrum for biasing said catch into engagement with said receiver, said first spring having a first spring constant; and a second spring acting between said wheel arm and said catch on a second side of said fulcrum opposite to said first side, said second spring having a second spring constant; wherein:

pivoting motion of said wheel arm moving said field wheel away from said trail frame applies tension to said second spring, thereby pivoting said catch about said fulcrum and disengaging it from said receiver.

13. The agricultural machine according to claim 12, wherein said second spring constant is greater than said first spring constant.

14. The agricultural machine according to claim 12, further comprising a cable extending between said second spring and said wheel arm.

15. The agricultural machine according to claim 14, further comprising an actuator acting between said trail frame and said wheel arm for effecting pivoting motion of said wheel arm relatively to said trail frame.

16. The agricultural machine according to claim 15, wherein said cable has a length such that said cable is slack for a portion of motion of said actuator moving said wheel arm away from said trail frame.

17. The agricultural machine according to claim 16, wherein said portion of said motion of said actuator comprises at least 50% of a full range of motion of said actuator.

18. The agricultural machine according to claim 14, further comprising a third spring acting between said cable and said trail frame.

19. The agricultural machine according to claim 15, wherein said actuator comprises a hydraulic actuator.

20. The agricultural machine according to claim 12, further comprising a header mounted on said trail frame, said header comprising a plurality of crop cutting blades.

* * * * *